(12) United States Patent
Fukumoto et al.

(10) Patent No.: US 11,314,954 B2
(45) Date of Patent: Apr. 26, 2022

(54) RFID TAG AND RFID TAG SYSTEM

(71) Applicant: KYOCERA Corporation, Kyoto (JP)

(72) Inventors: Katsuhiko Fukumoto, Yokohama (JP); Yuichi Tanaka, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/973,456

(22) PCT Filed: Jun. 11, 2019

(86) PCT No.: PCT/JP2019/023010
§ 371 (c)(1),
(2) Date: Dec. 9, 2020

(87) PCT Pub. No.: WO2019/240105
PCT Pub. Date: Dec. 19, 2019

(65) Prior Publication Data
US 2021/0248336 A1 Aug. 12, 2021

(30) Foreign Application Priority Data
Jun. 14, 2018 (JP) .............................. JP2018-113226

(51) Int. Cl.
*G06K 5/00* (2006.01)
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC ............. G06K 19/0723; G06K 7/0008; G06K 19/07749; G07F 7/1008; G07F 7/0866; G07F 7/08; G07F 7/082; G06Q 20/341; G06Q 20/3576; G06Q 20/3278; G06Q 20/352; G06F 21/77
USPC ............. 235/380, 382, 492; 340/10.51, 572.1
See application file for complete search history.

(56) References Cited

U.S. PATENT DOCUMENTS 5,796,092 A * 8/1998 Nagata ................. G06Q 20/341
235/380
2011/0298590 A1 12/2011 Lee et al.

FOREIGN PATENT DOCUMENTS

| JP | 2009-069313 A | 4/2009 |
| JP | 2010-072566 A | 4/2010 |
| JP | 2016-192179 A | 11/2016 |
| SE | 1650060 A1 | 8/2016 |

* cited by examiner

*Primary Examiner* — Jamara A Franklin
(74) *Attorney, Agent, or Firm* — Volpe Koenig

(57) ABSTRACT

An RFID tag includes an RFID device, an output device and a controller. The RFID device includes a storage from and into which information is readable and writable from a reading/writing apparatus through wireless communication. The output device outputs information. The controller reads information for output from the storage and controls the output device. The storage includes a first region into which the information for output is written and a second region separate from the first region. The controller updates data of the second region in response to updating output of the output device.

10 Claims, 7 Drawing Sheets

RFID TAG AND RFID TAG SYSTEM

TECHNICAL FIELD

The present disclosure relates to an RFID (Radio Frequency Identifier) tag and an RFID tag system that are capable of outputting information.

BACKGROUND ART

There has been proposed a technique of, in an RFID tag having a display, detecting failure of the display. (For example, see JP 2016-192179 A.) This RFID tag includes a photoelectric sensor that reads a detection pattern displayed on the display, and when the photoelectric sensor does not detect change in the detection pattern, a controller of the RFID tag determines that the display has a problem.

SUMMARY OF INVENTION

Solution to Problem

An RFID tag of the present disclosure includes:

an RFID device including a storage from and into which information is readable and writable from a reading/writing apparatus through wireless communication;

an output device that outputs information; and a controller that reads information for output from the storage and controls the output device, wherein the storage includes a first region into which the information for output is written and a second region separate from the first region, and wherein the controller updates data of the second region in response to updating output of the output device.

An RFID tag system of the present disclosure includes:

The above-described RFID tag; and the reading/writing apparatus, wherein after writing the information for output into the storage, the reading/writing apparatus determines whether the data of the second region has been updated.

Advantageous Effects of Invention

According to the present disclosure, an advantageous effect that is as follows can be obtained: allowing a reading/writing apparatus to check completion of an output-information update process in an RFID tag having an information output function, without causing a rise in costs.

DESCRIPTION OF EMBODIMENTS

Figure 1:
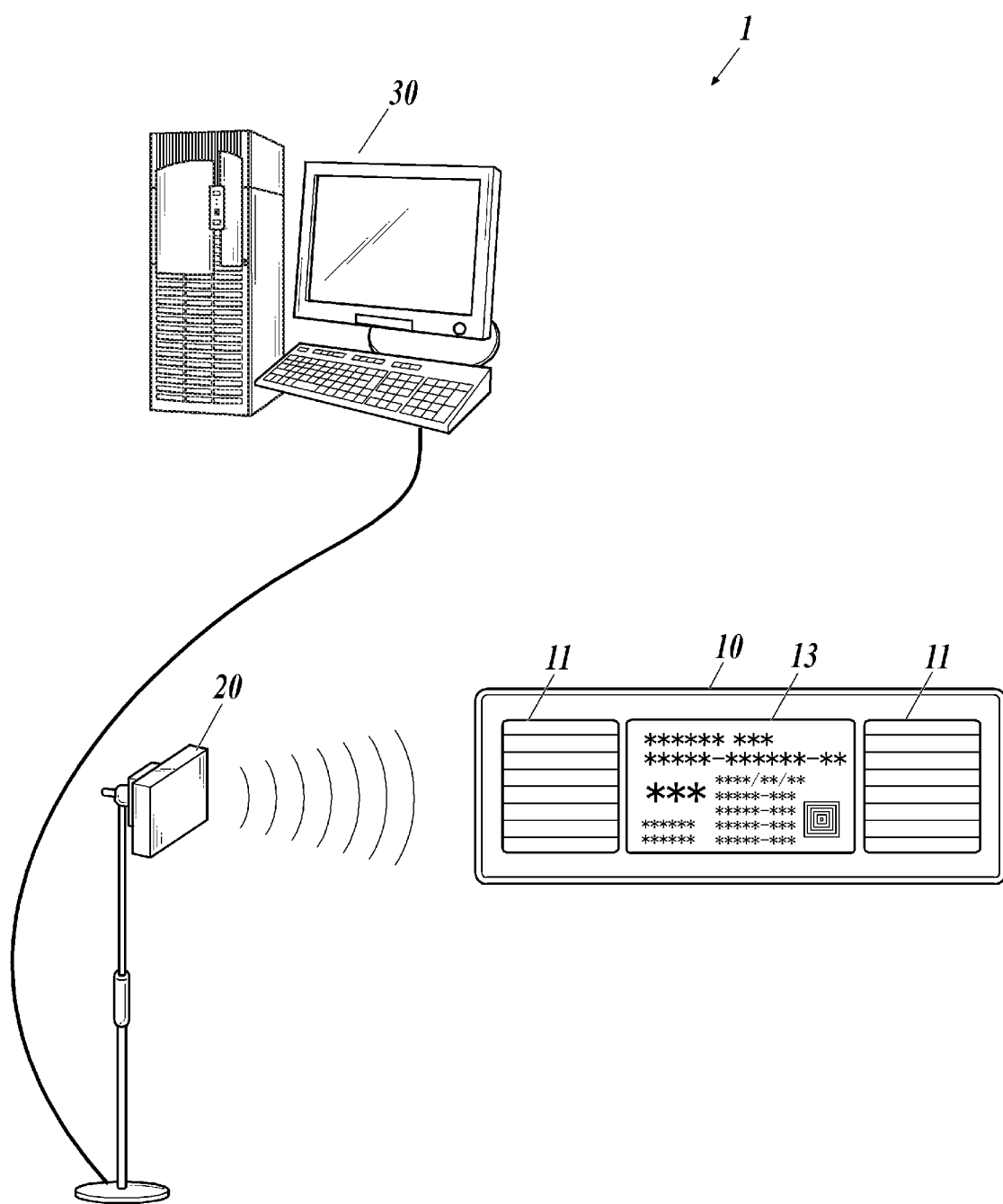
FIG. 1 is an illustration showing an RFID tag system according to an embodiment(s) of the present disclosure.
Figure 2:
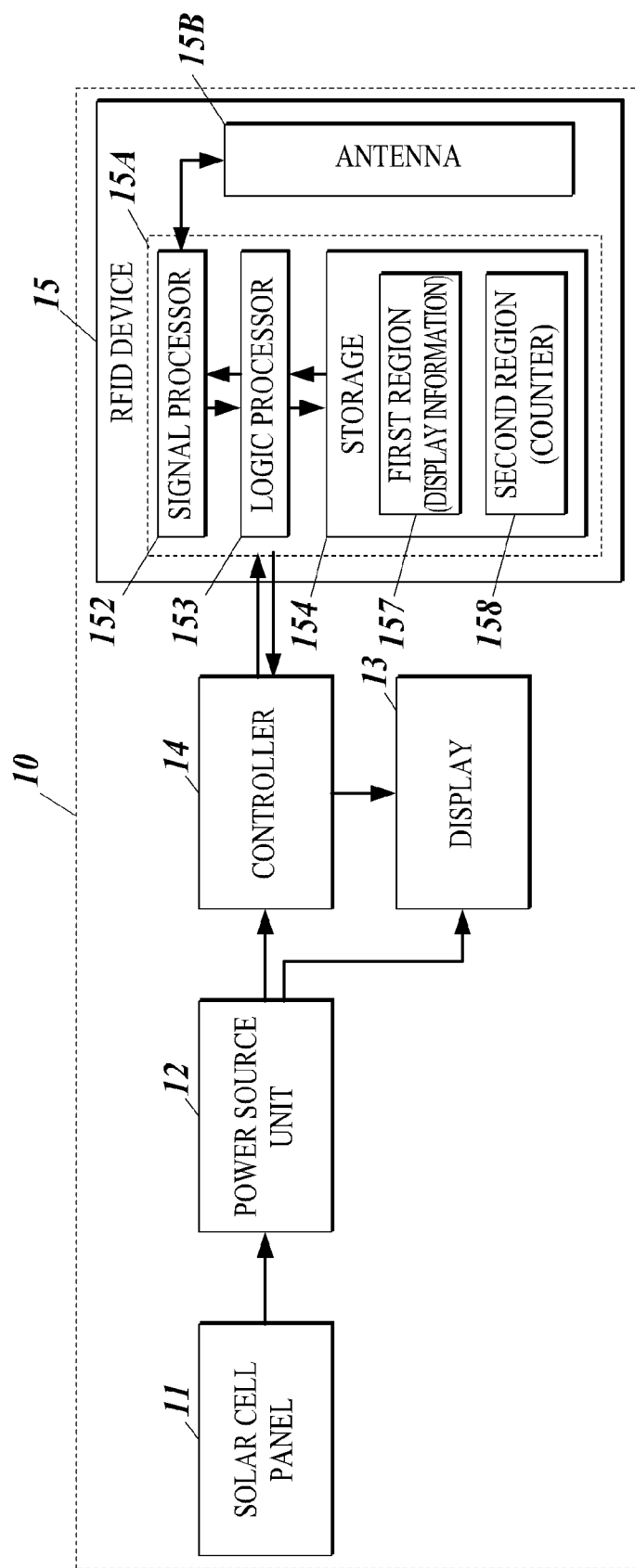
FIG. 2 is a block diagram showing an internal configuration of an RFID tag shown in FIG. 1.

Hereinafter, an embodiment(s) of the present disclosure will be described in detail with reference to the drawings. FIG. 1 is an illustration showing an RFID tag system according to an embodiment(s) of the present disclosure. FIG. 2 is a block diagram showing an internal configuration of an RFID tag.

An RFID tag system 1 according to this embodiment includes an RFID tag 10 having an information output function, a reader/writer 20 capable of writing and reading information into and from the RFID tag 10 through wireless communication, and a host computer 30. Among these, the reader/writer 20 and the host computer 30 correspond to an example of a reading/writing apparatus according to the present disclosure.

The host computer 30 includes a CPU (Central Processing Unit), a storage where programs that are executed by the CPU are stored, and an interface for exchanging signals or data with the reader/writer 20. The host computer 30 is connected to the reader/writer 20 through a cable or wirelessly, and controls the reader/writer 20, manages information that is displayed/output by the RFID tag 10, and totalizes information read from the RFID tag 10, for example.

The RFID tag 10 includes: a solar cell panel 11; a power source unit 12 that supplies a power-source voltage to each component; a display 13, such as a liquid crystal panel; a controller 14 that controls the display 13; and an RFID device 15. The display 13 corresponds to an example of an output device according to the present disclosure.

The power source unit 12 accumulates power supplied from the solar cell panel 11, generates a power-source voltage for control and a power-source voltage for display, and supplies these power-source voltages to the controller 14 and the display 13, respectively.

The controller 14 is a microcomputer including a CPU, a storage where a control program(s) and control data are stored, and an interface for exchanging signals with the outside of the controller 14. The controller 14 can control display content of the display 13 by driving the display 13, and also can read information from a storage 154 of the RFID device 15 and write information into the storage 154 by communicating with the RFID device 15 through a cable.

The RFID device 15 is configured by mounting an IC (Integrated Circuit) chip 15A for an RFID tag on a circuit board where an antenna 15B for wireless communication is disposed. The IC chip 15A includes a signal processor 152 that demodulates and modulates radio signals, a logic processor 153 that performs a predetermined type(s) of logic processing, and the storage 154 where data is stored.

The logic processor 153 receives requests, an address and information from the reader/writer 20 through the signal processor 152. The logic processor 153 writes information into the storage 154 on the basis of a writing request, and also reads information from the storage 154 on the basis of a reading request and sends the information to the reader/writer 20 through the signal processor 152. The logic processor 153 also receives requests, an address and information from the controller 14. The logic processor 153 writes information into the storage 154 on the basis of a writing request, and also reads information from the storage 154 on the basis of a reading request and sends the information to the controller 14. Further, when writing information into the storage 154 on the basis of a writing request from the reader/writer 20, the logic processor 153 outputs, to the controller 14, an interrupt signal that corresponds to a notification of an update of information.

The storage 154 is, for example, a rewritable nonvolatile memory, and includes a storage region for identification information that identifies each individual RFID tag 10, a first region 157 where display information is stored, and a second region 158 where a count value on which addition or subtraction is performed is stored. The identification information may be stored in a part of the first region 157. The display information corresponds to an example of "information for output" according to the present disclosure.

The second region 158 constitutes a counter. The second region 158 is a software counter that is controlled such that a count value on which addition or subtraction has been performed by arithmetic processing of the controller 14 or the reader/writer 20, which writes data, is stored. Alternatively, the second region 158 may be a hardware counter where, by input of an up signal or a down signal from the logic processor 153, addition or subtraction is performed on a stored value. In either case, the second region 158 is configured such that the count value therein is updatable and readable from the controller 14 and the reader/writer 20.

<Control Process by RFID Tag>

Figure 3:
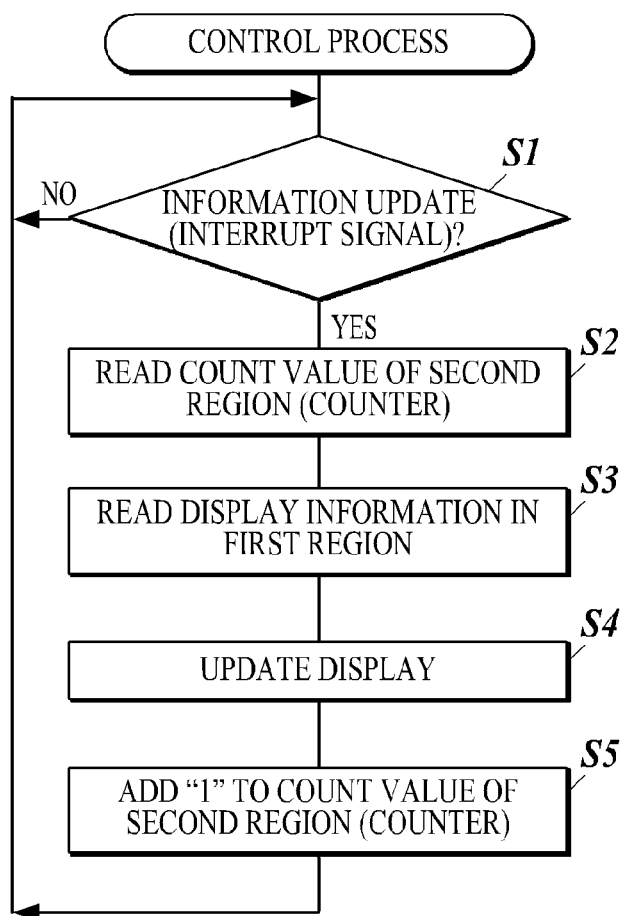
FIG. 3 is a flowchart showing a procedure of a control process that is performed by a controller.

Next, control processes by the RFID device and the host computer will be described. FIG. 3 is a flowchart showing a procedure of a control process that is performed by the controller.

In the RFID tag 10, the controller 14 for the display 13 performs the control process shown in FIG. 3 at the time of normal operation. When a process is shifted to the control process shown in FIG. 3, display information is already output on the display 13 by, for example, an initialization process at the time of, for example, power-on.

When a process is shifted to the control process shown in FIG. 3, the controller 14 enters a stop state and waits for input of an interrupt signal (Step S1). The interrupt signal is output from the logic processor 153 to the controller 14 when information is written into the storage 154 of the RFID device 15 from the reader/writer 20. The interrupt signal corresponds to a notification of an update of information in the storage 154.

When information is written into the storage 154 and an interrupt signal is input, the controller 14 first reads the count value at the time from the second region 158 (counter) of the storage 154 (Step S2).

Next, the controller 14 reads the display information written into the first region 157 of the storage 154 (Step S3), and outputs this information from the display 13, thereby updating display of the display 13 (Step S4).

When display of the display 13 is updated, the controller 14 adds "1" to the count value of the second region 158 (counter) of the storage 154, thereby updating the count value (Step S5). That is, the controller 14 overwrites the second region 158 with a value obtained by adding "1" to the count value read in Step S2. Then, the controller 14 returns the process to Step S1 to repeat the process from Step S1.

<Control Process by Host Computer>

Figure 4:
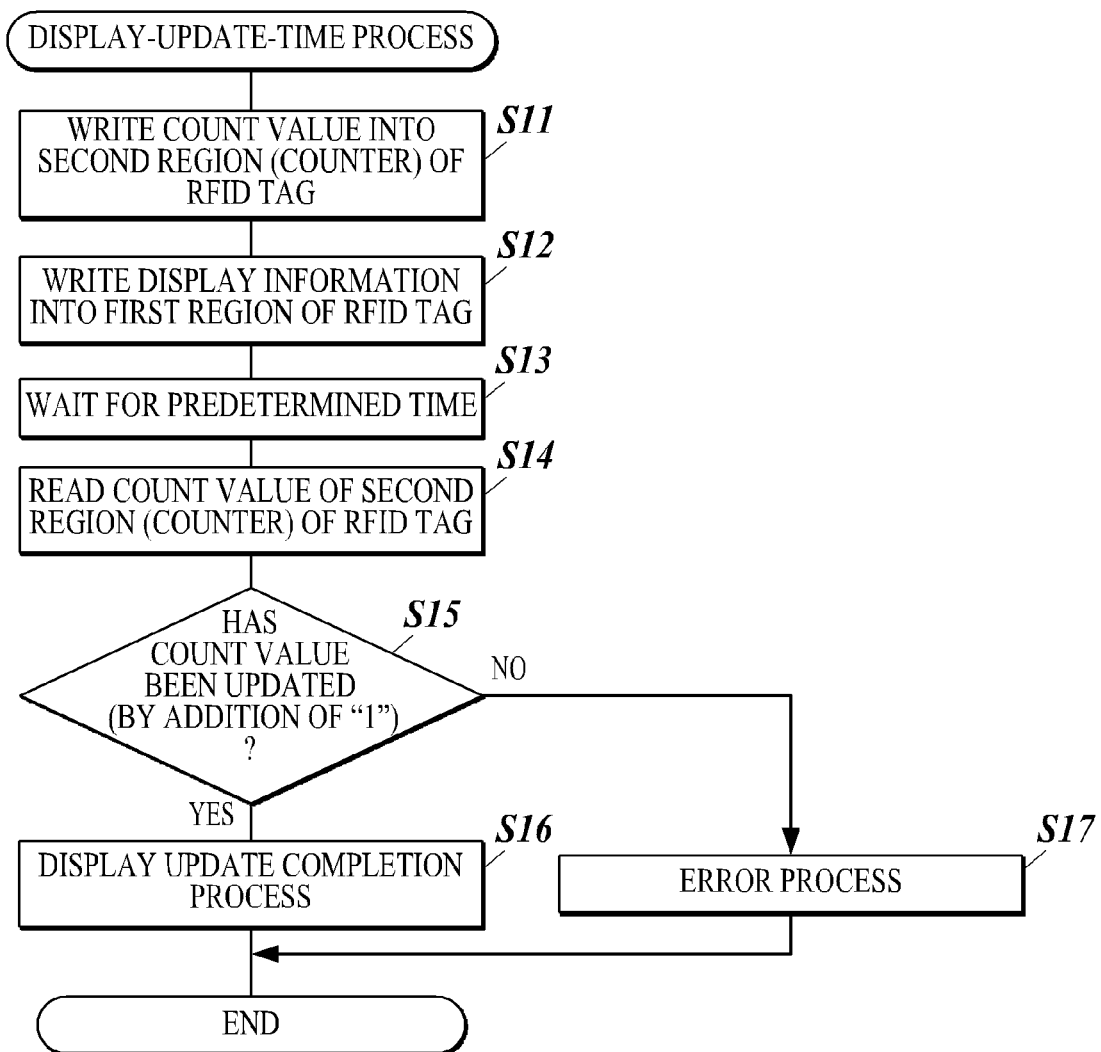
FIG. 4 is a flowchart showing a procedure of a display-update-time process that is performed by a CPU of a host computer at the time of an update of display.

FIG. 4 is a flowchart showing a procedure of a display-update-time process that is performed by the CPU of the host computer at the time of an update of display. The CPU of the host computer 30 (which is simply referred to as "CPU" in the description of FIG. 4) performs the display-update-time process shown in FIG. 4 in response to a request to update display of the RFID tag 10 from an operator, a high-order system or the like.

When the display-update-time process is started, the CPU first drives the reader/writer 20 to write a count value into the second region (counter) 158 of the storage 154 of the RFID tag 10 (Step S11). The count value may be an arbitrary value, or a value obtained by updating (e.g. adding "1" to) the count value registered in the second region 158 before the display-update-time process. This count value corresponds to an example of "first data" according to the present disclosure.

Next, the CPU drives the reader/writer 20 to write display information for an update into the first region 157 of the storage 154 of the RFID tag 10 (Step S12).

When display information is written thereinto, the CPU waits for a predetermined time (Step S13), and then drives the reader/writer 20 to read the count value of the second region (counter) 158 of the storage 154 of the RFID tag 10 (Step S14). The waiting time in Step S13 will be described later.

Next, the CPU compares the count value written in Step S11 with the count value read in Step S14 to determine whether the count value has been updated (Step S15). As a result of the determination, if the count value has been updated, the CPU performs a display update completion process (Step S16), whereas if the count value has not been updated, the CPU performs an error process (Step S17).

The display update completion process of Step S16 is a process following completion of an update of display of the RFID tag 10, such as a process of writing a value indicating the completion into a section of a display update step for the RFID tag 10 in a step management table managed by the host computer 30.

The error process of Step S17 is a process for making up for an error in an update of display, such as a process of retrying an update of display or a process of outputting, after a predetermined number of retries, an alert to encourage replacement of the RFID tag 10.

When the CPU performs the process of Step S16 or the process of Step S17, the display-update-time process ends.

<Operation at Time of Update of Display>

Figure 5:
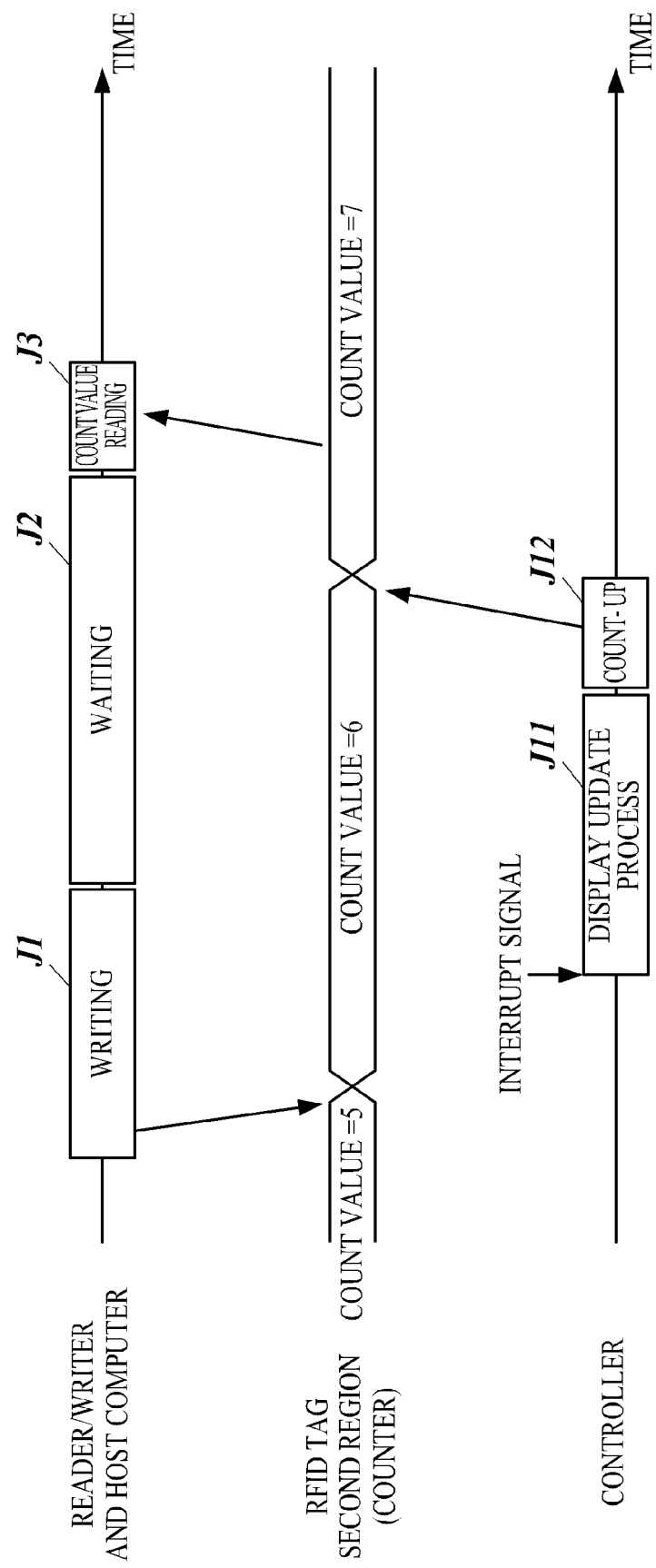
FIG. 5 is a timing chart for explaining operation of the RFID tag system according to the embodiment at the time of an update of display.

Next, operation of the RFID tag system 1 that is made to proceed by the control process shown in FIG. 3 and the display-update-time process shown in FIG. 4 will be described. FIG. 5 is a timing chart for explaining operation of the RFID tag system 1 at the time of an update of display.

As shown in FIG. 5, first, at the start of the display-update-time process by the host computer 30, a writing process J1 of a count value and display information into the RFID tag 10 is performed from the reader/writer 20 (Step S11 and Step S12 in FIG. 4). By writing a count value, the count value of the second region 158 of the RFID tag 10 becomes a value (e.g. "6") known by the host computer 30. In the example of FIG. 5, "1" is added to the count value so that the count value after the writing is different from the count value before the writing by "1", but an arbitrary count value unrelated to the value before the writing may be written into the second region 158 in the writing process J1.

When information is written into the RFID tag 10 by the writing process J1, an interrupt signal is output to from the logic processer 153 to the controller 14, and on the basis of this, the controller 14 performs a display update process J11 and a count-up process J12 of the count value of the second region 158. The processes J11 and J12 correspond to the processes of Step S2 to Step S5 in FIG. 3. The count value of the second region 158 of the RFID tag 10 is updated to, for example, "7" by the count-up process J12.

During the display update process J11 and the count-up process J12, data reading/writing from the reader/writer 20 is not performed because of a waiting process J2 (Step S13 in FIG. 3) by the host computer 30. After the timing of completion of the count-up process J12, the reader/writer 20 performs a reading process J3 (Step S14 in FIG. 4) to read the count value of the second region 158 from the RFID tag 10. That is, the waiting time of the waiting process J2 is set in advance such that the reading process J3 of the count value is performed after completion of the display update process J11 and the count-up process J12.

By such operation, the CPU of the host computer 30 can determine, on the basis of the count value read by the reading process J3, whether the display update process J11 has been completed. That is, when the display update process J11 is performed by the RFID tag 10, the count value of the second region 158 is updated (e.g. to "7") as shown in FIG. 5. On the other hand, when some sort of error occurs and the display update process J11 is not performed by the RFID tag 10, the subsequent count-up process J12 is not performed either, and consequently the count value of the second region 158 is not updated (e.g. stays at "6"). Thus, the CPU of the host computer 30 can determine that the display update process J11 has been completed when the read count value is an updated value (e.g. "7"), or determine that the display update process J11 has not been completed when the read count value is a non-updated value. By such determination, the reader/writer 20 and the host computer 30 can perform a process(es) appropriate to completion or non-completion of the display update process J11.

As described above, according to the RFID tag 10 and the RFID tag system 1 of this embodiment, the storage 154 of the RFID tag 10 includes the first region 157 where display information is stored and the second region 158 separate from the first region 157. Further, the controller 14 for the display 13 updates data of the second region 158 after the display update process J11 (FIG. 5). Hence, the host computer 30 can check completion of the display update process J11 by determining whether the data of the second region 158 has been updated. The update of the data of the second region 158 and the determination about the update do not require addition of any hardware component, and accordingly do not cause a rise in costs of the RFID tag system 1.

Further, according to the RFID tag 10 and the RFID tag system 1 of this embodiment, the second region 158 of the storage 154 constitutes a counter, and the controller 14 for the display 13 updates the count value of the second region 158 by performing addition on the count value. Hence, even when the data of the second region 158 is updated multiple times by multiple times of the display update process, the value indicating an update and the value indicating a non-update are hardly confused, and accordingly whether the display update process has been completed or not can be determined with high reliability every time.

Further, according to the RFID tag system 1 of this embodiment, after writing display information into the RFID tag 10 via the reader/writer 20, the host computer 30 determines whether the data of the second region 158 has been updated. Hence, the host computer 30 can check completion of the display update process J11 by performing the above-described determination without performing a redundant process on the RFID tag 10 in which the display update process J11 is automatically started on the basis of display information writing.

Further, according to the RFID tag system 1 of this embodiment, the host computer 30 writes a count value into the second region 158 of the storage 154 before the RFID tag 10 performs the display update process J11. The host computer 30 then compares the written count value with the count value read thereafter from the second region 158 to determine whether the count value has been updated. This can prevent the count value before an update and the count value after the update from being confused and further improve reliability of the determination process, which is performed by the host computer 30. Further, the host computer 30 can write a count value into the second region 158 and write display information into the first region collectively as a series of writing processes. This can shorten a communication time between the RFID tag 10 and the reader/writer 20.

Further, according to the RFID tag system 1 of this embodiment, the host computer 30 performs the error process (Step S17 in FIG. 4) in response to determining that the count value of the second region 158 has not been updated in the display-update-time process. This can prevent a non-update(s) of display information of the RFID tag 10 from being overlooked and further improve reliability of display information of the RFID tag 10.

(Modification)

Figure 6:
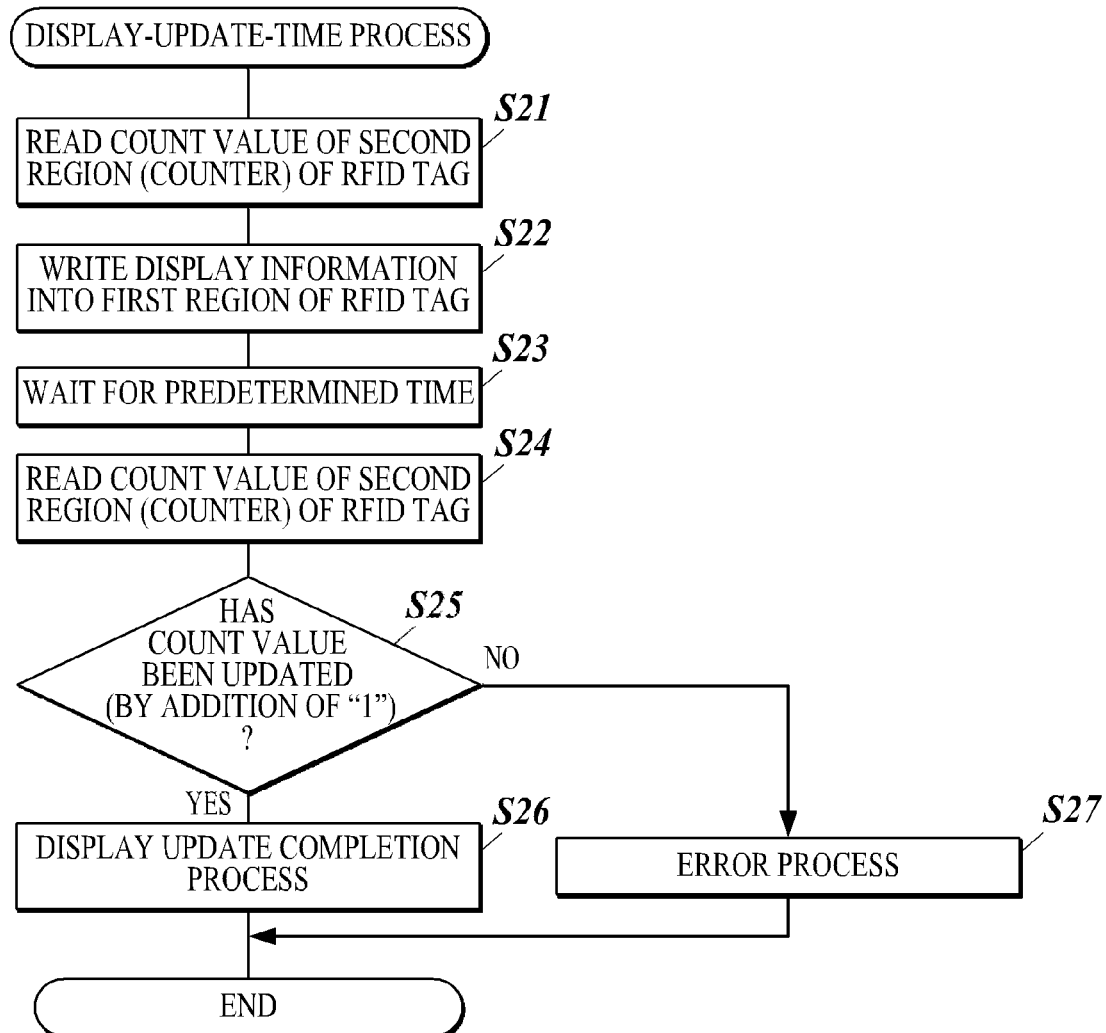
FIG. 6 is a flowchart showing a procedure of a modification of the display-update-time process that is performed by the host computer at the time of an update of display.
Figure 7:
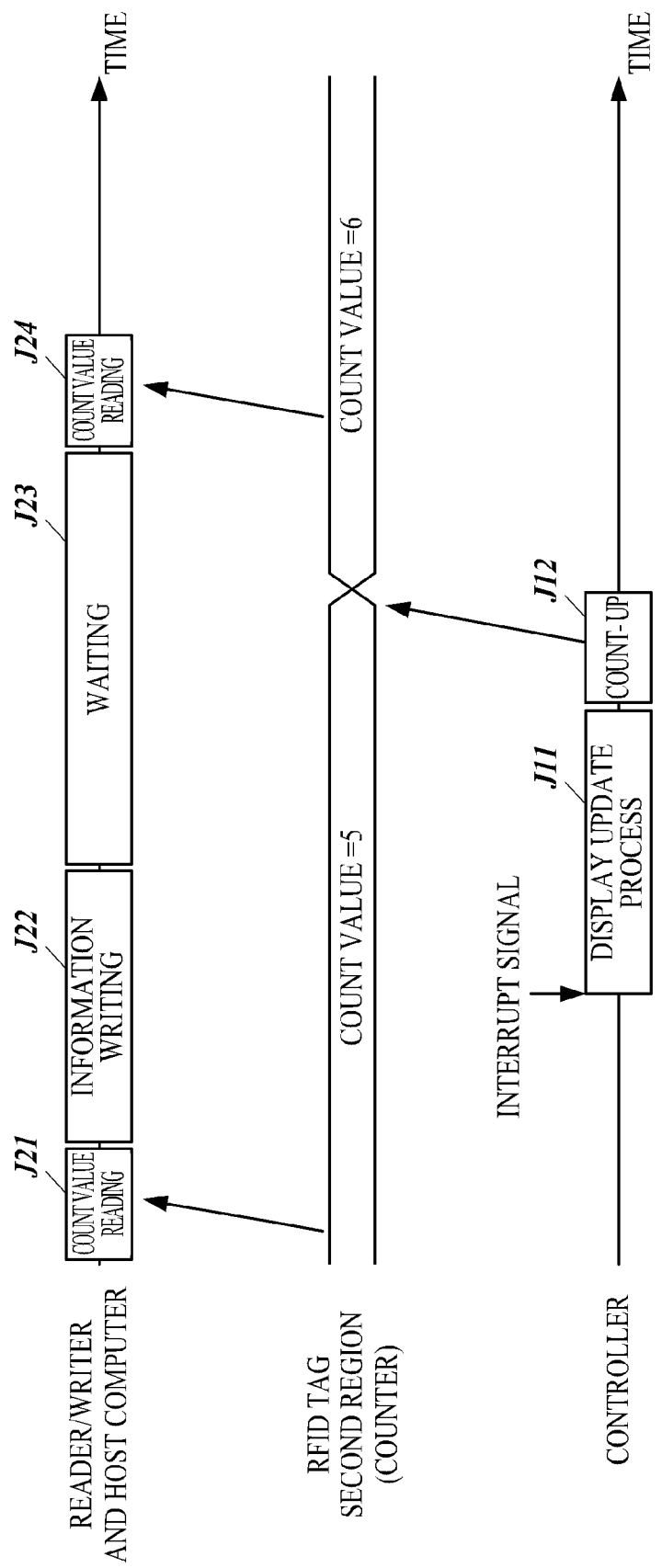
FIG. 7 is a timing chart for explaining, in the modification, operation of the RFID tag system according to the embodiment at the time of an update of display.

FIG. 6 is a flowchart showing a procedure of a modification of the display-update-time process that is performed by the host computer at the time of an update of display. FIG. 7 is a timing chart for explaining, in the modification, operation of the RFID tag system according to the embodiment at the time of an update of display.

Hereinafter, a modification where part of the processes by the host computer 30 and the reader/writer 20 has been changed will be described. In the modification, as shown in FIG. 6, when the display-update-time process is started, the CPU of the host computer 30 drives the reader/writer 20 to read the count value at the time from the second region 158 of the storage 154 of the RFID tag 10 (Step S21). This count value corresponds to an example of "second data" according to the present disclosure. Processes of subsequent Step S22 to Step S27 are the same as those of Step S12 to Step S17 in FIG. 4, provided that in Step S25, the CPU of the host computer 30 compares the count value read in Step S21 with the count value read in Step S24 to determine whether the count value has been updated.

As shown in FIG. 7, in the modification, at the start of the display-update-time process, a reading process J21 of the count value of the second region 158 of the RFID tag 10 is performed from the reader/writer 20. Then, as with the operation shown in FIG. 5, during a writing process J22 of display information for an update and a waiting process J23, the controller 14 for the display 13 performs the display update process J11 and the count-up process J12, thereby updating the count value of the second region 158. After the waiting process J23, the reader/writer 20 reads the count value of the second region 158, and the CPU of the host computer 30 checks whether the count value has been updated. Hence, the reader/writer 20 and the host computer 30 can check whether the display update process J11 has been completed.

In the modification, the reading process J21 of the count value of the second region 158 is performed by the host computer 30 at the start of the display-update-time process. However, there is a case where before the start of the display-update-time process, the host computer 30 reads the count value of the second region 158 of the RFID tag 10 and it is obvious that no display update process has been performed since then. In such a case, the reading process J21 of the count value in the display-update-time process may be omitted, and the host computer 30 may perform the determination process about an update of the count value in the display-update-time process by using the count value of the second region 158 previously read by and stored in the host computer 30.

As described above, in the RFID tag system 1 of the modification too, the host computer 30 can check completion of the display update process J11, which is performed by the RFID tag 10, by reading the count value of the second region 158 from the RFID tag 10. This can further improve reliability of display information of the RFID tag 10 without causing a rise in costs.

Further, according to the RFID tag system 1 of the modification, the host computer 30 determines, by using the count value of the second region 158 read before the RFID tag 10 performs the display update process J11, whether the count value has been updated after completion of the display update process J11, which is performed by the RFID tag 10. This can prevent the count value before an update and the count value after the update from being confused and further improve reliability of the determination process, which is performed by the host computer 30. Further, in a case where a system in which the load of data reading from the RFID tag 10 is lower than that of data writing thereinto is employed, an advantageous effect as follows can be obtained: reducing the load of the display-update-time process.

In the above, an embodiment(s) has been described. In the above embodiment, as an output device that outputs information, the display capable of dot display is used. However, the output device according to the present disclosure may be any device as far as it is capable of outputting information to the outside. Examples thereof include: a sound output device, such as a speaker; a display device that lights or flashes one or more lamps; and a wireless communication device that sends information via a wireless LAN (Local Area Network). Further, in the above embodiment, as the reading/writing apparatus that reads and writes information from and into the RFID tag 10, a combination of the reader/writer 20 and the host computer 30 that controls the reader/writer 20 is shown. However, when the reader/writer 20 includes a CPU that determines whether the count value has been updated or not, or includes an error-notifying means in addition to the CPU, the host computer may be omitted and the reader/writer alone may be applied to the reading/writing apparatus according to the present disclosure.

Further, in the above embodiment, an example is shown in which the second region of the storage is configured as a counter. However, the second region may store any data as far as completion of the output-information update process can be determined by an update of the data. For example, the second region may be a storage region where process identification data identifying the output-information update process and flag data indicating that the process has been completed or not been completed are stored. Further, in the case where the second region is configured as a counter, the count value may be updated by not addition but subtraction, or the additional value or the subtraction value may be not "1" but another. Further, the power source of the RFID tag may be changed variously in structure. For example, instead of the solar cell, a primary battery or a secondary battery (storage battery) as a chemical battery or a combination of a solar cell and a secondary battery may be used. The description of the embodiment is illustrative in every aspect, and hence the present invention is not limited thereto. The present disclosure is applicable to the embodiment subjected to appropriate combination, change, replacement, addition, omission and/or the like of the aspect(s) as far as there is no inconsistency. It is appreciated that not-shown numerous modifications can be envisaged without departing from the scope of the present invention.

INDUSTRIAL APPLICABILITY

The present disclosure is applicable to an RFID tag and an RFID tag system.

The invention claimed is:

1. An RFID tag system comprising:
a reading/writing apparatus; and
an RFID tag comprising:
   an RFID device including a storage from and into which information is readable and writable from the reading/writing apparatus through wireless communication;
   an output device that outputs information; and
   a controller that reads information for output from the storage and controls the output device,
wherein the storage includes a first region into which the information for output is written and a second region separate from the first region,
wherein the controller updates data of the second region in response to updating output of the output device,
wherein after writing the information for output into the storage, the reading/writing apparatus determines whether the data of the second region has been updated, and
wherein the reading/writing apparatus writes first data into the second region before the output device updates the output, and compares data stored in the second region with the first data after writing the information for output into the storage.

2. The RFID tag system according to claim 1, wherein the second region constitutes a counter, and wherein the controller updates the data of the second region to a value obtained by performing addition or subtraction on the data.

3. The RFID tag system according to claim 2, wherein the reading/writing apparatus performs an error process in response to determining that the data of the second region has not been updated.

4. The RFID tag system according to claim 1, wherein the reading/writing apparatus performs an error process in response to determining that the data of the second region has not been updated.

5. An RFID tag system comprising:
a reading/writing apparatus; and
an RFID tag comprising:
   an RFID device including a storage from and into which information is readable and writable from the reading/writing apparatus through wireless communication;
   an output device that outputs information; and
   a controller that reads information for output from the storage and controls the output device,
wherein the storage includes a first region into which the information for output is written and a second region separate from the first region,
wherein the controller updates data of the second region in response to updating output of the output device, wherein after writing the information for output into the storage, the reading/writing apparatus determines whether the data of the second region has been updated, and wherein the reading/writing apparatus reads data stored in the second region as second data before the output device updates the output, and compares data stored in the second region with the second data after writing the information for output into the storage.

6. The RFID tag system according to claim 5, wherein the second region constitutes a counter, and wherein the controller updates the data of the second region to a value obtained by performing addition or subtraction on the data.

7. The RFID tag system according to claim 6, wherein the reading/writing apparatus performs an error process in response to determining that the data of the second region has not been updated.

8. The RFID tag system according to claim 5, wherein the reading/writing apparatus performs an error process in response to determining that the data of the second region has not been updated.

9. An RFID tag system comprising:
a reading/writing apparatus; and
an RFID tag comprising:
an RFID device including a storage from and into which information is readable and writable from the reading/writing apparatus through wireless communication;
an output device that outputs information; and
a controller that reads information for output from the storage and controls the output device, wherein the storage includes a first region into which the information for output is written and a second region separate from the first region, wherein the controller updates data of the second region in response to updating output of the output device, wherein after writing the information for output into the storage, the reading/writing apparatus determines whether the data of the second region has been updated, and wherein the reading/writing apparatus performs an error process in response to determining that the data of the second region has not been updated.

10. The RFID tag system according to claim 9, wherein the second region constitutes a counter, and wherein the controller updates the data of the second region to a value obtained by performing addition or subtraction on the data.

* * * * *